United States Patent
Fujiwara

[11] Patent Number: 5,218,673
[45] Date of Patent: Jun. 8, 1993

[54] INFORMATION PROCESSING SYSTEM

[75] Inventor: Takutoshi Fujiwara, Tokyo, Japan

[73] Assignee: Canon Kabushiki Kaisha, Tokyo, Japan

[21] Appl. No.: 735,662

[22] Filed: Jul. 26, 1991

Related U.S. Application Data

[63] Continuation of Ser. No. 339,873, Apr. 18, 1989, abandoned, which is a continuation of Ser. No. 104,554, Sep. 29, 1987, abandoned, which is a continuation of Ser. No. 658,759, Oct. 9, 1984, abandoned.

[30] Foreign Application Priority Data

Oct. 12, 1983 [JP] Japan ............................ 58-191342
Oct. 12, 1983 [JP] Japan ............................ 58-191343

[51] Int. Cl.$^5$ ............... G06F 15/20; G09G 1/02; G06K 7/10
[52] U.S. Cl. ................... 396/164; 340/799; 235/454
[58] Field of Search ........ 395/164; 235/454; 340/799, 750

[56] References Cited

U.S. PATENT DOCUMENTS

| | | | |
|---|---|---|---|
| 3,210,733 | 10/1965 | Terzian et al. | 364/200 X |
| 3,370,276 | 2/1968 | Schell, Jr. | 364/200 |
| 3,411,139 | 11/1968 | Lynch et al. | 364/200 |
| 3,689,984 | 9/1972 | Laura et al. | 364/200 |
| 3,865,478 | 2/1975 | Ooue et al. | 353/26 |
| 4,000,485 | 12/1976 | Barlow et al. | 364/200 |
| 4,013,876 | 3/1977 | Anstin | 364/900 X |
| 4,042,914 | 8/1977 | Curley et al. | 364/200 |
| 4,081,604 | 3/1978 | Kamaiwa | 178/30 |
| 4,139,901 | 2/1979 | Ganske et al. | 364/900 |
| 4,164,024 | 8/1979 | Gilbert | 364/900 |
| 4,205,780 | 6/1980 | Burns et al. | 235/454 |
| 4,264,808 | 4/1981 | Owens et al. | 235/379 |
| 4,270,182 | 5/1981 | Asija | 364/900 |
| 4,400,777 | 8/1983 | Mori | 364/200 |
| 4,491,874 | 1/1985 | Yamamoto | 358/296 |
| 4,509,139 | 4/1985 | Creager, Sr. | 364/900 |
| 4,513,390 | 4/1985 | Walter et al. | 364/900 |
| 4,544,956 | 10/1985 | Shimizu | 358/296 |
| 4,601,003 | 7/1986 | Yoneyama et al. | 364/518 |
| 4,658,299 | 4/1987 | Tanaka et al. | 358/256 |
| 4,760,458 | 7/1988 | Watanabe et al. | 358/256 |
| 4,760,526 | 7/1988 | Takeda et al. | 364/300 |

FOREIGN PATENT DOCUMENTS

| | | |
|---|---|---|
| 49-36242 | 4/1974 | Japan . |
| 49-52949 | 5/1974 | Japan . |
| 56-22772 | 2/1981 | Japan . |
| 57-29279 | 9/1982 | Japan . |

OTHER PUBLICATIONS

Baer, J., Computer Systems Architecture, Computer Science Press, 1980, pp. 216–265, 309–321.

*Primary Examiner*—Dale M. Shaw
*Assistant Examiner*—Kee M. Tung
*Attorney, Agent, or Firm*—Fitzpatrick, Cella, Harper & Scinto

[57] ABSTRACT

An information processing system combines a microfilm file and an electronic file, such as an optomagnetic disk, to achieve a versatile information storage/retrieval function. The microfilm file provides a legally acceptable archival information storage, while the electronic file is used for facilitating retrieval.

37 Claims, 13 Drawing Sheets

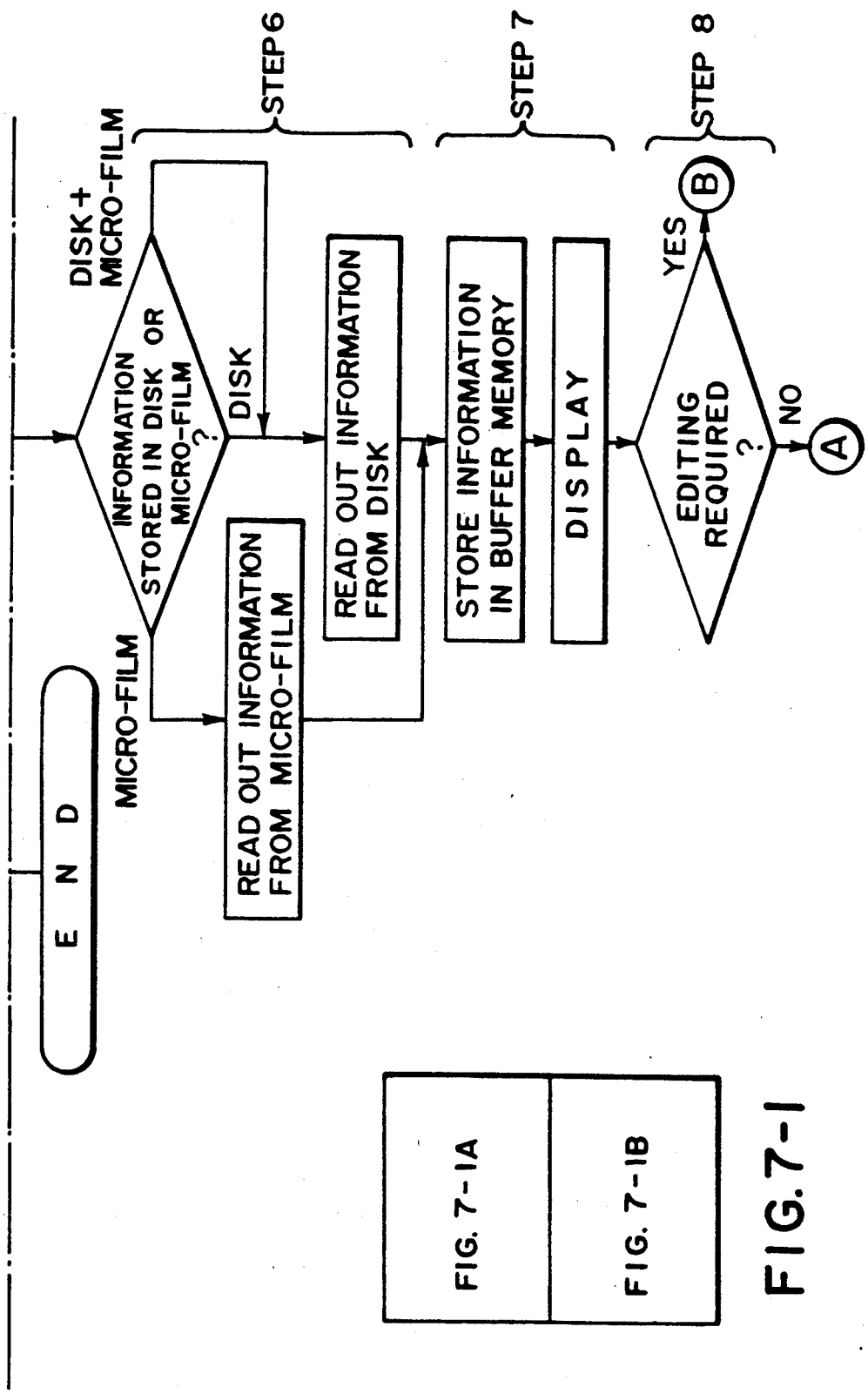

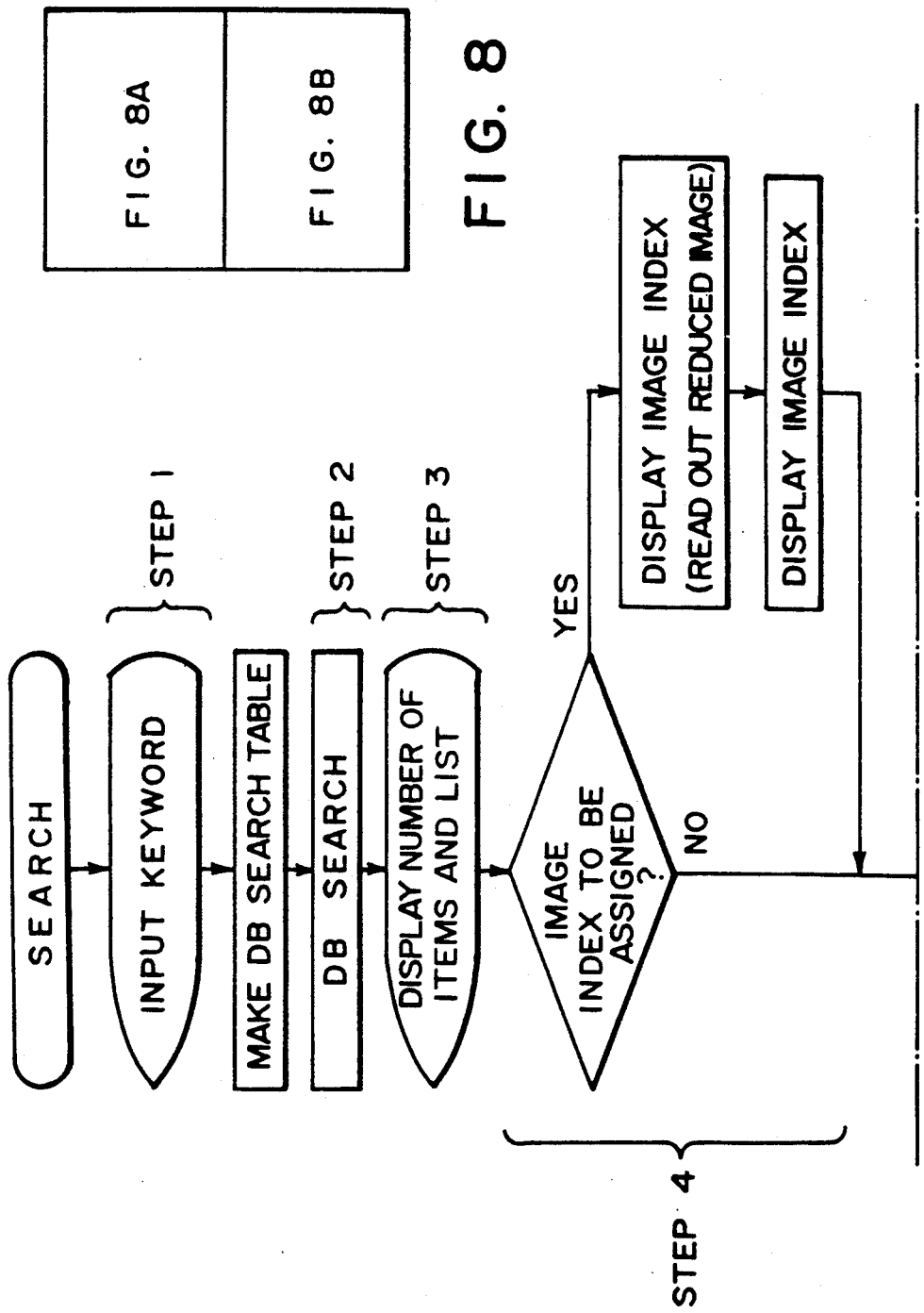

INFORMATION PROCESSING SYSTEM

This application is a continuation of application Ser. No. 07/339,873 filed Apr. 18, 1989, now abandoned, which is a continuation of application Ser. No. 07/104,554 filed Sept. 29, 1987, now abandoned, which is a continuation of application Ser. No. 06/658,759 filed Oct. 9, 1984, now abandoned.

BACKGROUND OF THE INVENTION

1. Field of the Invention

The present invention relates to an information processing system for storing and retrieving information.

2. Description of the Prior Art

Microfilm systems have conventionally been utilized for storing and utilizing a very large amount of information. Microfilms have advantages of human readability, ability for storing non-coded image information, economy, archieval property, high resolving power etc., and are suitable for effectively storing and utilizing filed information increasing year after year since they allow fast input and high-speed copying of a large amount of information.

On the other hand, recent remarkable progress of so-called office automation has stimulated the introduction of computers into the offices and the mutual connection of various devices through communication lines. In order to adapt to such tendency of wider use of computers and communication, the information to be handled should preferably be stored in the form of electrical signals. For this reason much attention is being paid to electronic file systems which store information in the form of electrical signals and have advantages of high-speed retrieval and high-speed transmission which cannot be achievable with the microfilm files.

While the electronic file systems have the above-mentioned advantages and can satisfactorily adapt to the currently progressing trend of office automation, the conventional microfilm systems are unable to adapt to such tendency, particularly in terms of lack of compatibility with the recent office equipment designed to match the trend of computerization.

FIG. 1 shows an example of the conventional microfilm system, or a reader-printer typically utilized for obtaining hard copies. In FIG. 1, the light from a light source 1 is transmitted by a microfilm 2 and a lens 3, and is reflected by a fixed mirror 4. In the use as a reader, a movable mirror 5 is positioned at a, whereby the light reflected by the fixed mirror 4 is projected onto a screen 6 to reproduce the image of the microfilm on said screen. On the other hand, in the use as a printer, the movable mirror 5 is moved to a position b to guide the light reflected by the fixed mirror 4 onto a photosensitive sheet 7, which is then processed in a developing unit 8 and ejected as a hard copy.

However, such process not only requires time but also is associated with an unsatisfactory image quality. In order to improve the image quality there is also proposed to guide the reflected light from the movable mirror 5 at the position b into an ordinary copier to prepare a hard copy. However the drawback of time requirement is not resolved since in any case there is required a procedure of retrieving a desired microfilm from a large file and setting said microfilm on the reader-printer for obtaining a hard copy. Besides, the transmission of the microfilmed information to a distant location can only be made by mailing or by facsimile transmission and cannot in any way adapt to the trend of office automation.

In order to avoid such drawbacks there is proposed a microfilm file as shown in FIG. 2. It is to be noted that the equipment shown in FIG. 2 utilizes microfiches 10 which are stored in a given order in a magazine 9.

For viewing a microfilm frame containing a desired document with such file, an address A is entered through an input device (not shown), for example keyboard. In response to said address A a search unit 11 rotates the magazine 9 and stops it at a selected position. Then a drive mechanism (not shown) takes out the microfiche 10 from the magazine 9 and locates the desired frame. After the desired frame is properly positioned, a light source 12 is turned on and the light therefrom is transmitted through a lens 13, the desired frame of the microfiche 10 and a lens 14 to enter a half mirror 15. The light reflected by said half mirror 15 is transmitted through a lens 16 to project the image of the desired frame onto an optical screen (not shown).

The hard copying or transmission to a distant location of the information displayed on the screen is conducted in the following manner. The light transmitted by the half mirror 15 is converted by a photoelectric converter 17 into electrical signals, which are subjected to signal processing such as digitization and amplification in a signal processor 18 to provide image data D. The photoelectric converter 17 performs scanning in a direction of arrows under the control of a scanning control unit 19, thus converting the image information of the entire frame into the electrical signals. The image data D thus obtained from the desired frame are transmitted to an unrepresented hard copying unit or a facsimile transmitter. Said photoelectric converter 17 is composed for example of a CCD linear sensor. Naturally the scanning drive can be dispensed with if a two-dimensional area senser is employed.

FIG. 3 shows an example of microfilm file employing a microfilm in the form of roll. The structure is essentially same as that shown in FIG. 2, except the driving method for search is somewhat different because the microfilm 20 is contained in a cartridge 21.

The structure shown in FIG. 2 or FIG. 3 enables retrieval, hard copying and transmission at a higher speed, utilizing microfilms either in the roll form or card form represented by microfiches.

FIG. 4 shows an example of an electronic file system, in which a document reader 22, a printer 23, a work station 24 and a memory 26 are connected to a controller 27 to constitute a system. However an index file 25 is connected to the work station 24.

The document reader 22, utilizing for example a charge-coupled device (CCD), raster scans a document to convert the information into electrical signals, which are stored as image data into the memory 26 after suitable processing such as amplification and digitization. In this manner the desired documents can be stored in succession into the memory 26.

It will be evident that the memory 26 should preferably have a capacity as large as possible. For example, in case of an optical disk memory, a disk of 30 cm in diameter can store non-coded information corresponding to about 50 document files, or a small file cabinet. The optical disk can naturally be replaced by an optomagnetic disk. At the storage of a document in the memory 26, the corresponding index is simultaneously memorized in the index file 25.

For obtaining a hard copy of a document stored in the memory 26, a keyword of the desired document is entered through the work station 24. Thus the desired document is read from the memory 26 with reference to the index file 25, and the printer 23 prepares a hard copy of said document.

The printer 23 may be of an electrostatic printer or a laser beam printer. Also the information can be monitored as a soft copy displayed on the work station 24 instead of hard copying.

The controller 27 is used for controlling the entire system, and is provided with interfaces, signal compression/expansion circuits etc. The controller 27 may be independent as shown in FIG. 4 or integral with the document reader 22, printer 23, work station 24 or memory 26.

Such electronic file achieves automatic retrieval within a short period of 2 to 10 seconds in response to the instruction from the work station 24, as a large amount of documents is stored in the form of electrical signals through the document reader 22. Also it is provided with a splendid advantage of information retrieval even immediately after the information recording, since the developing process as required in the microfilm is no longer necessary.

On the other hand, some advantages of the microfilm are inevitably sacrificed. Such losses include a slower input speed caused by the photoelectric conversion through raster scanning instead of one-shot conversion through a lens system in the microfilm system, lack of human readability, lack of possibility of high-speed and economical copying below several hundred copies, lack of proven ability of archival storage over 10 to 20 years in contrast to the proven history of microfilms over 100 years, and lack of ability as legal evidence for which the microfilms are already authorized.

A still larger problem is that the data base and information hitherto accumulated with the microfilms become no longer usable at the introduction of the electronic file. As already explained, the microfilm file and the electronic file have respective advantages. Although the electronic file has more advantages in consideration of the recent trend of office automation, the microfilm system cannot be evidently neglected. There has therefore been desired an information storage adaptable to a comprehensive information processing system making use of the advantages of the electronic file such as the high retrieval speed while fully utilizing the information accumulated in the microfilms.

SUMMARY OF THE INVENTION

In consideration of the foregoing, an object of the present invention is to eliminate the above-described drawbacks.

Another object of the present invention is to provide an information processing system capable of storing a large amount of information and retrieving and providing arbitrary information at a high speed from thus stored information.

Still another object of the present invention is to provide an information processing system comprising microfilms and an electronic file.

Still another object of the present invention is to provide an information processing system comprising microfilms allowing high-speed retrieval.

Still another object of the present invention is to provide an information processing system comprising microfilms and an electronic file, and allowing information retrieval and output with preferential choice on the electronic file.

Still another object of the present invention is to provide an information processing system comprising an electronic file and other information processing equipment.

Still another object of the present invention is to provide a comprehensive information processing system comprising an information processing equipment including an optomagetic disk and other information processing equipment including, for example, microfilms, and capable of high-speed retrieval.

Still another object of the present invention is to provide an information processing system in which the desired information is given from an electronic file if said information is stored in said electronic file and other information processing equipment.

Still another object of the present invention is to store, in an electronic file containing, for example, an optomagnetic disk, indexes of information stored in other information processing equipment containing for example microfilms, thereby enabling high-speed retrieval.

Still another object of the present invention is to provide an information processing system comprising a first information processing equipment of a higher retrieval speed and a second information processing equipment of a lower retrieval speed, wherein the first equipment is utilized as far as possible to achieve faster information retrieval.

Still another object of the present invention is to achieve efficient information processing in a system comprising plural information processing equipment of different functions and performances.

Still another object of the present invention is to provide an information processing system in which the index information, such as title and contracted index word, is stored in a first information processing equipment of a higher retrieving speed, and more detailed information, if needed, is obtained as far as possible from said first equipment of higher retrieving speed.

BRIEF DESCRIPTION OF THE DRAWINGS

FIG. 7-1 shows the relationship of FIGS. 7-1A and 7-1B which together with FIGS. 7-2A and 7-2B are a detailed flow chart showing the function of said system.

DETAILED DESCRIPTION OF THE PREFERRED EMBODIMENTS

Now the present invention will be clarified in detail by an embodiment thereof shown in the attached drawings.

Figure 5:
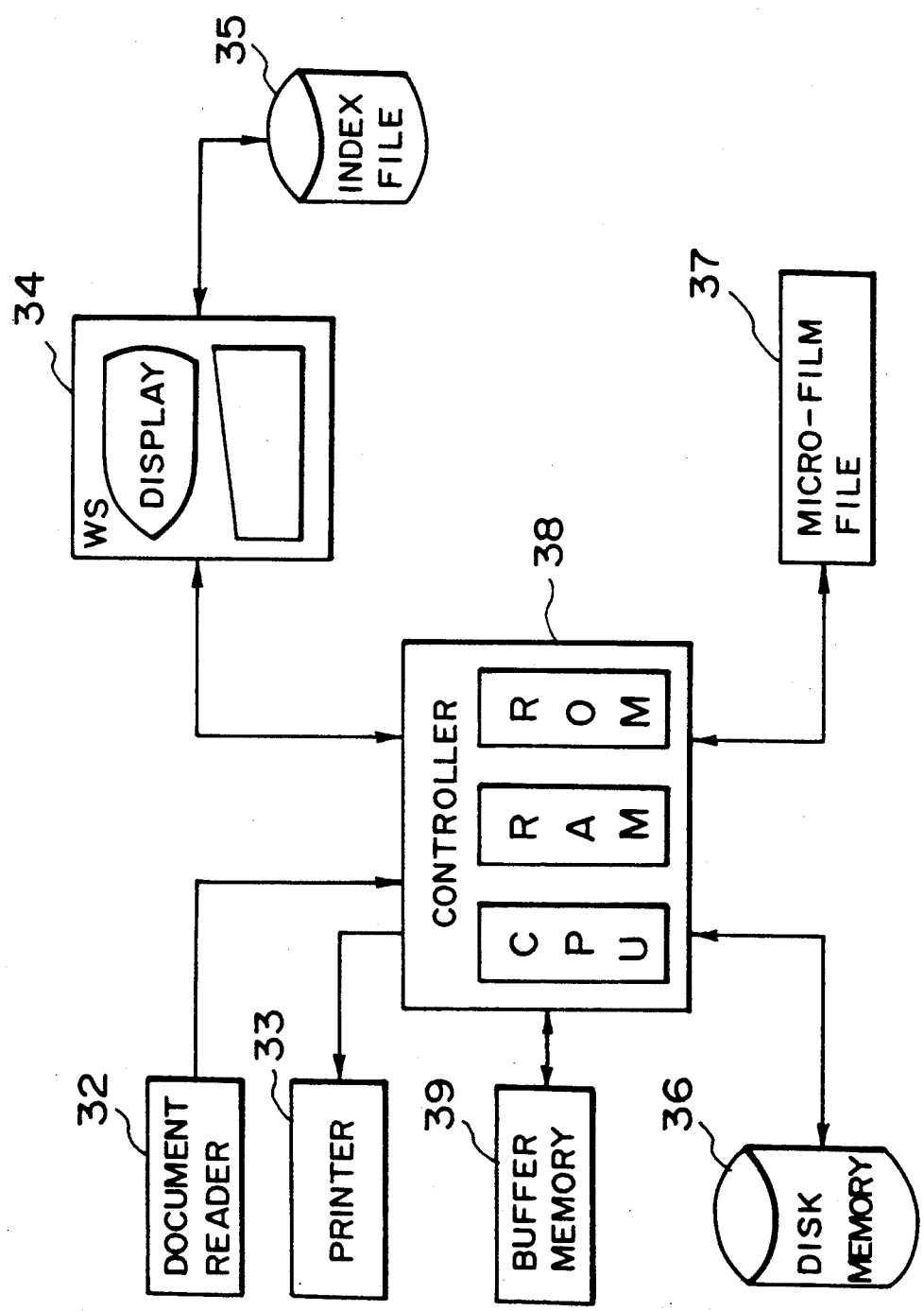
FIG. 5 is a block diagram showing an embodiment of the information processing system of the present invention.

FIG. 5 shows an embodiment of the information processing system of the present invention, wherein shown are a document reader 32; a printer 33; a work station 34; an index file 35; a disk memory 36 capable of storing non-coded information and constituting an electronic file of a capacity of 500 to 2000 MBytes; another information processing unit 37, for example a microfilm file with a capacity of about 3,000 sheets in case of a cassette file; a controller 38; and a buffer memory 39.

A large number of documents is read with the document reader 32 and is stored in the disk memory 36 which is preferably composed of a random-access high-density, large-capacity memory allowing a search time of 2 to 10 seconds for example, such as an optical disk, in consideration of space saving. Simultaneously with said storage, the indexes of the information stored in the disk memory 36 are stored in the index file 35 and controlled by the work station 34.

Figure 2:
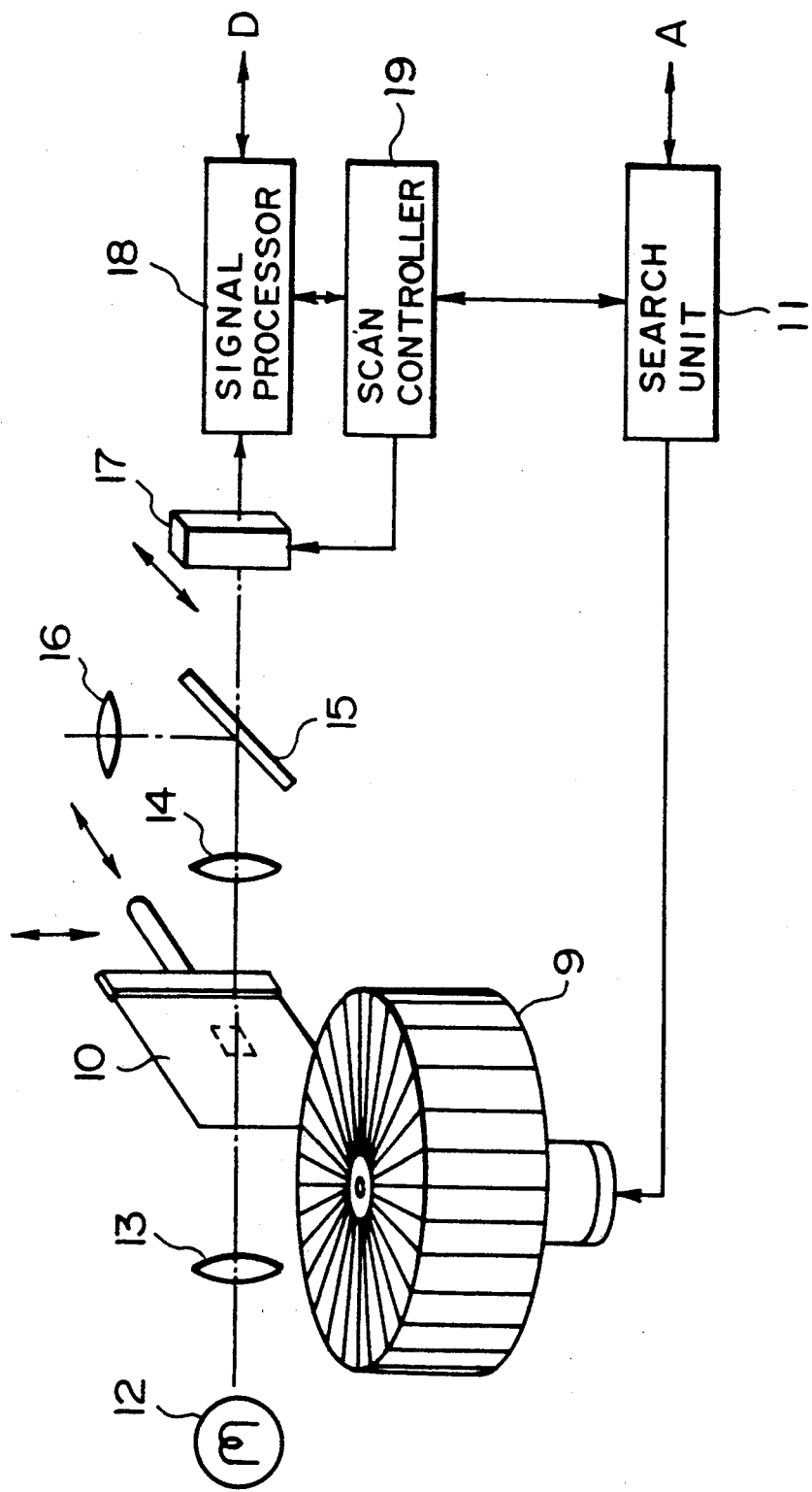
FIG. 2 is a block diagram of a microfiche file.
Figure 3:
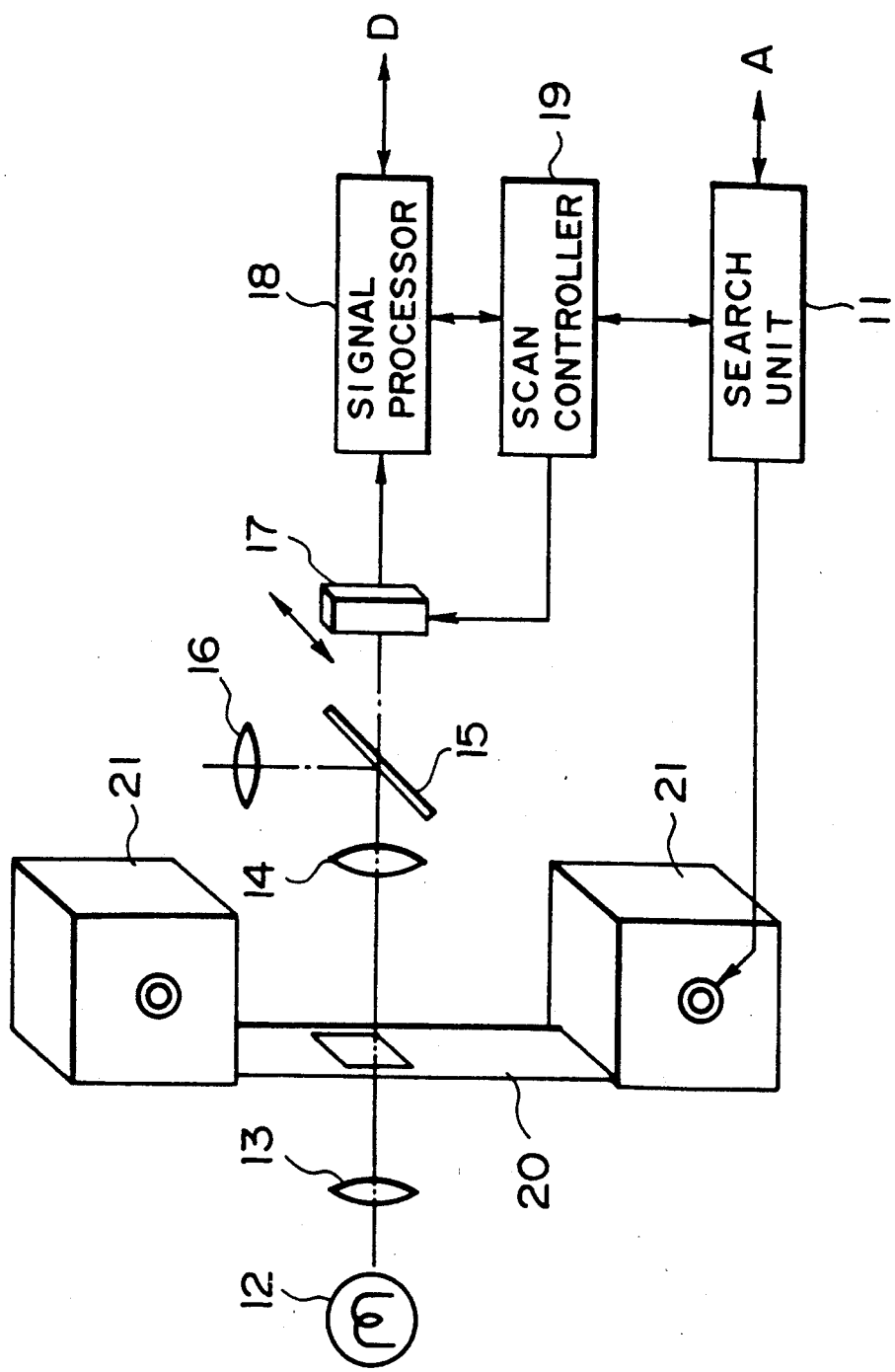
FIG. 3 is a block diagram of a microfilm roll reader-printer.
Figure 4:
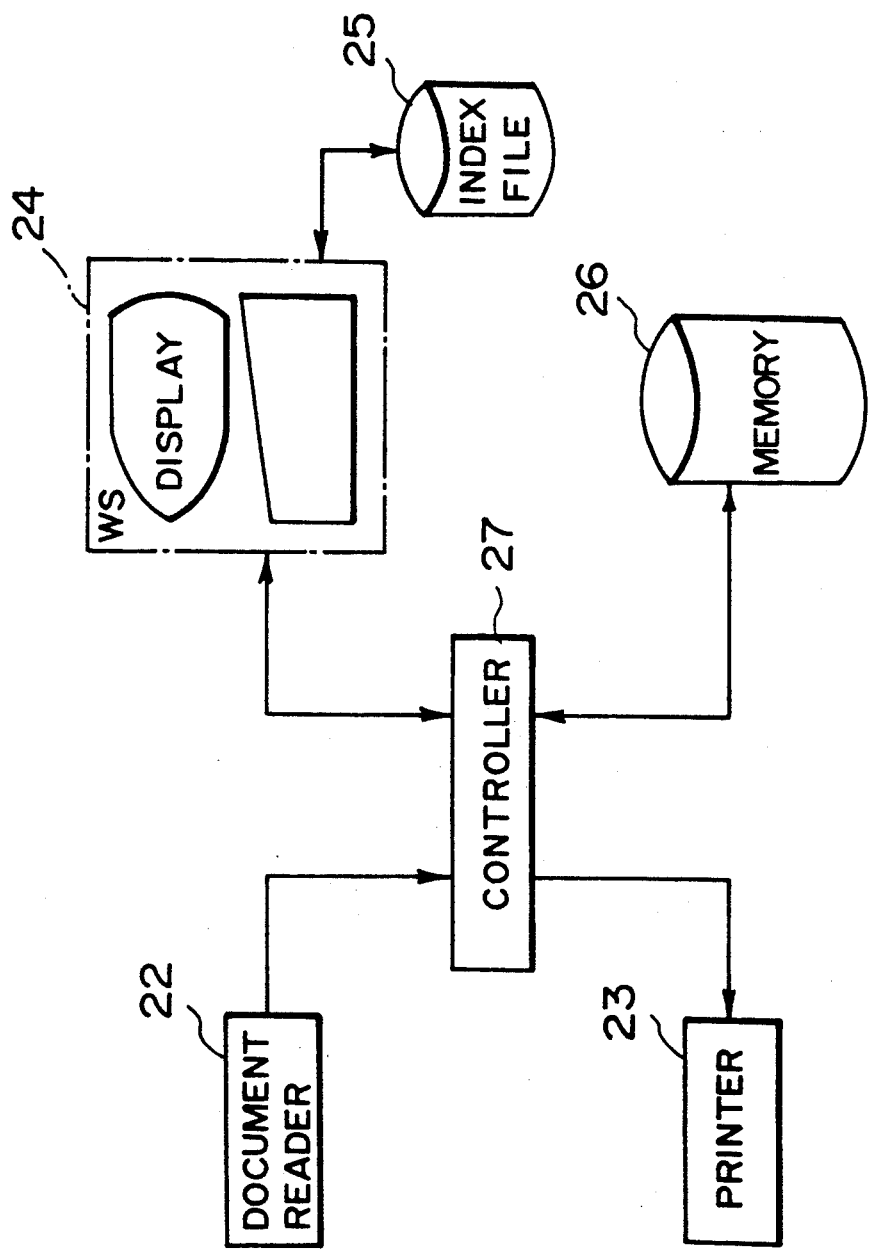
FIG. 4 is a block diagram of a conventional electronic file.

The microfilm file 37 is preferably composed of a microfilm file with an automatic searching function as shown in FIGS. 2 and 3, but may also be composed of a microfilm file at least provided with means for converting the microfilm image into electrical signals by means of raster scanning. The searching time may be as long as 10 to 20 seconds. In the present embodiment there is employed a unit employing microfilm rolls as shown in FIG. 3.

The index of each frame of the microfilm contained in the microfilm file 37 is stored, in a similar manner as the index of each information stored in the disk memory 36, in the index file 35 and controlled by the work station 34. The index file 35 may be composed of a magnetic disk memory, floppy disks, or a semiconductor memory in the work station 34. The controller 38 is composed of a known microcomputer, and comprises a read-only memory (ROM), a random access memory (RAM) and a central processing unit (CPU).

Figure 6A:
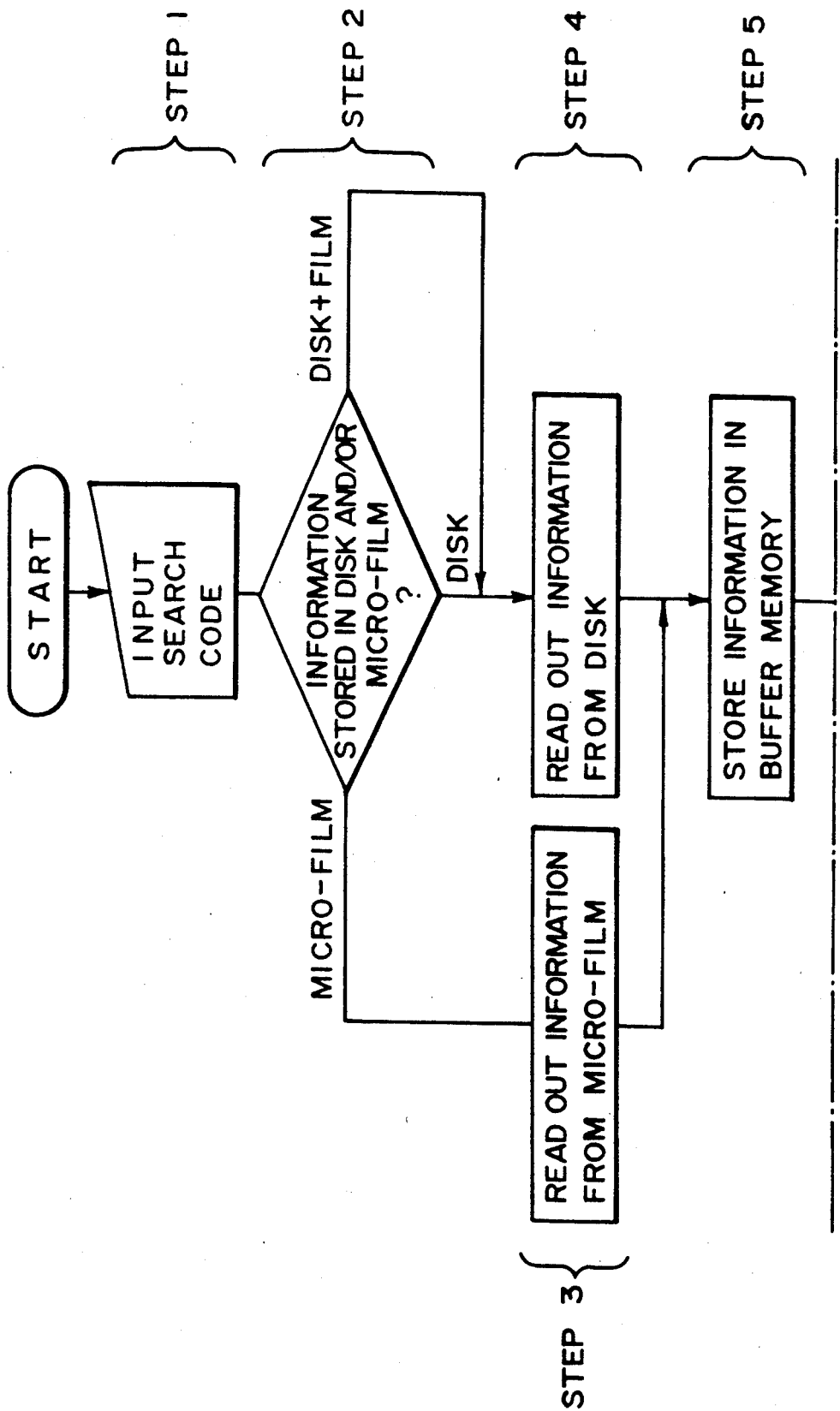
FIG. 6 shows the relationship of FIGS. 6A and 6B which are a flow chart showing the function of the embodiment shown in FIG. 5.
Figure 6:
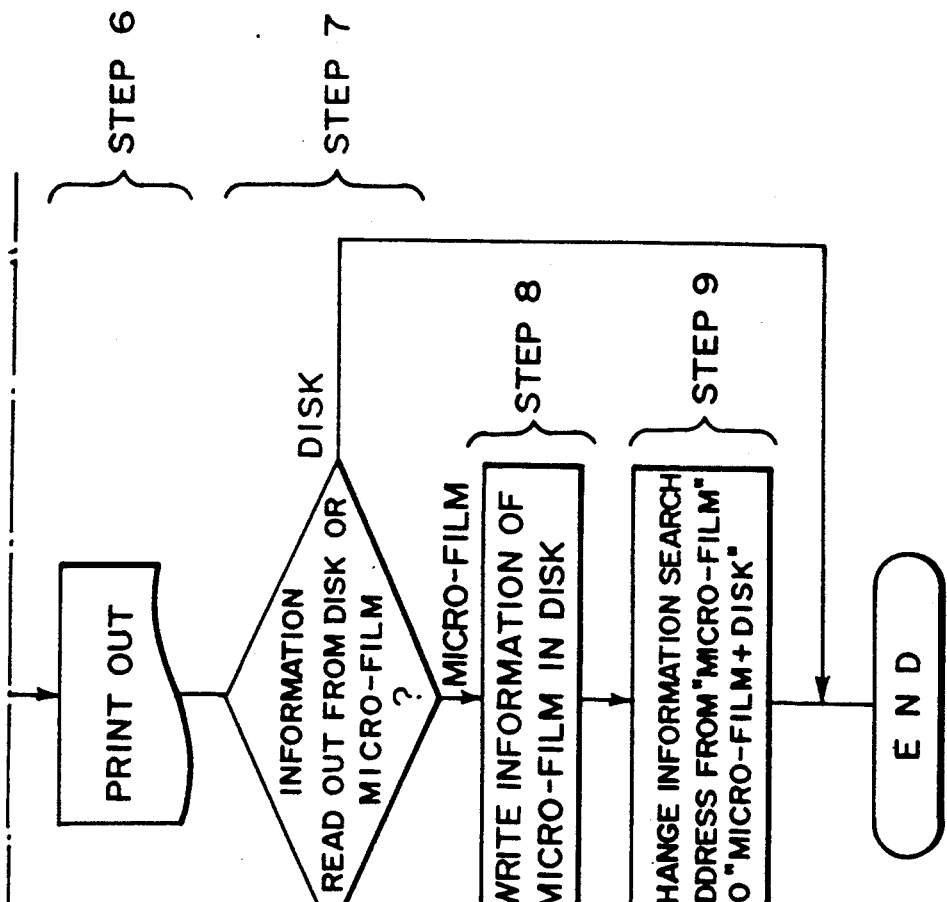
Figure 6:
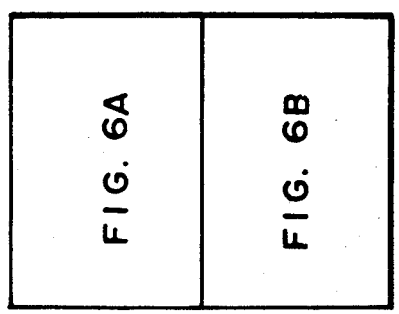

In the following there will be explained the function of the present embodiment, making reference to a flow chart in FIG. 6, showing the principal control program of the present embodiment. Said program is stored in advance in the ROM of the controller 38, and the CPU performs control operations for various units according to said program.

At first, in Step 1, the operator enters search codes, for example keywords, date, personal name, title, index etc. of the desired information through input means (keyboard, voice input etc.) of the work station 34. Then, in Step 2, the work station 34 compares the entered search codes with the indexes stored in the index file 35 to identify whether the desired information is stored in the disk memory 36 or the microfilm file 37 or both, and transmits the track number in case of disk or the frame number in case of microfilm from the index file 35 to the controller 38.

Subsequently the controller 38 reads said desired information in response to said address information. For example, if said information is stored in the microfilm file 37, said file retrieves a frame recording said information in response to the entered frame number, converts the two-dimensional image information into electrical signals by means of raster scanning, and sends said electrical signals to the controller 38 after determined signal processing (Step 3). In case said information is stored in the disk memory 36 or both in the disk memory 36 and in the microfilm file 37, said information is read from the disk memory (Step 4). The information thus read is stored in the buffer memory 39 (Step 5), and printed by the printer 33 (Step 6). Said printout may be replaced by a display. Then a Step 7 identifies whether said information has been read from the disk or from the microfilm file, and, in case of the latter, a Step 8 records the information of the buffer memory 39 into the disk of the disk memory 36. Subsequently the search address for said information in the index file 35 is changed from "microfilm" to "microfilm and disk" (Step 9), and all the operations are completed. The Steps 8 and 9 are skipped in case the information has been read from the disk.

Since the information once searched has a very high probability of being subjected to repeated searches, in the present invention, the information retrieved from the microfilm is also stored in the disk, thus reducing the search time by reading said information from the disk at the second search. Also in case the information is recorded both in the microfilm and in the disk from the beginning, the information is exclusively read from the disk to expedite the information search.

In the foregoing description, the controller 38 is constructed as an independent unit, but it may be made integral with the document reader 32, printer 33, work station 34, disk memory 36 or microfilm file 37. Also the buffer memory 39 is not always necessary and may be dispensed with if the information read from the disk memory etc. can be stored on real-time basis into the microfilm file or supplied for printout. Furthermore, the information output is not limited to hard copy printout but also includes a soft copy on the display of the work station or a transmission to other information equipment.

Figure 1:
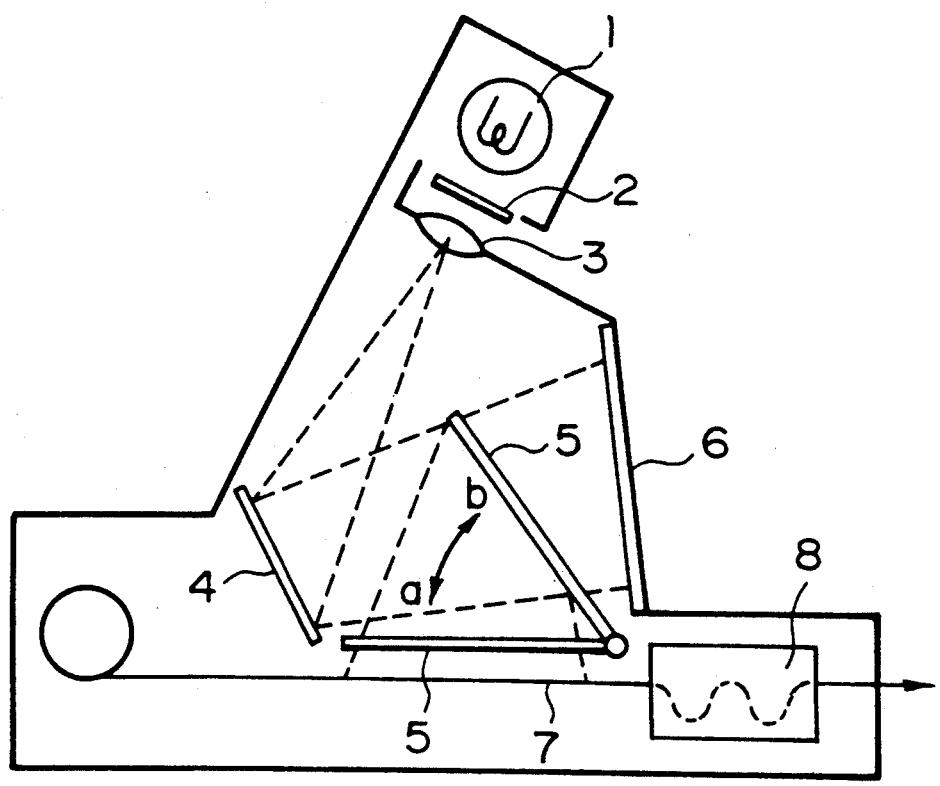
FIG. 1 is a schematic cross-sectional view of a microfilm reader-printer.
Figures 1A, 7:
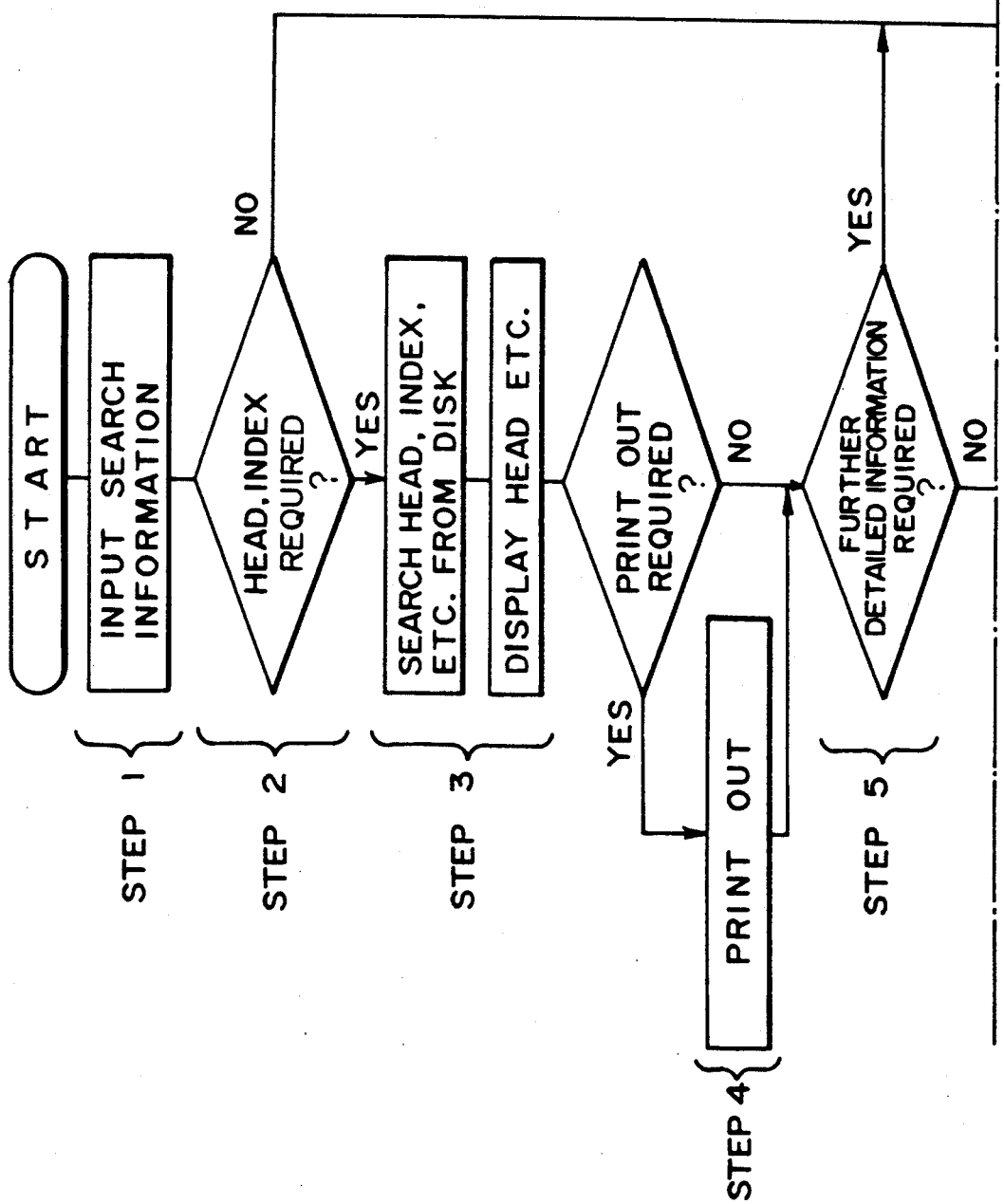
Figures 2A, 7:
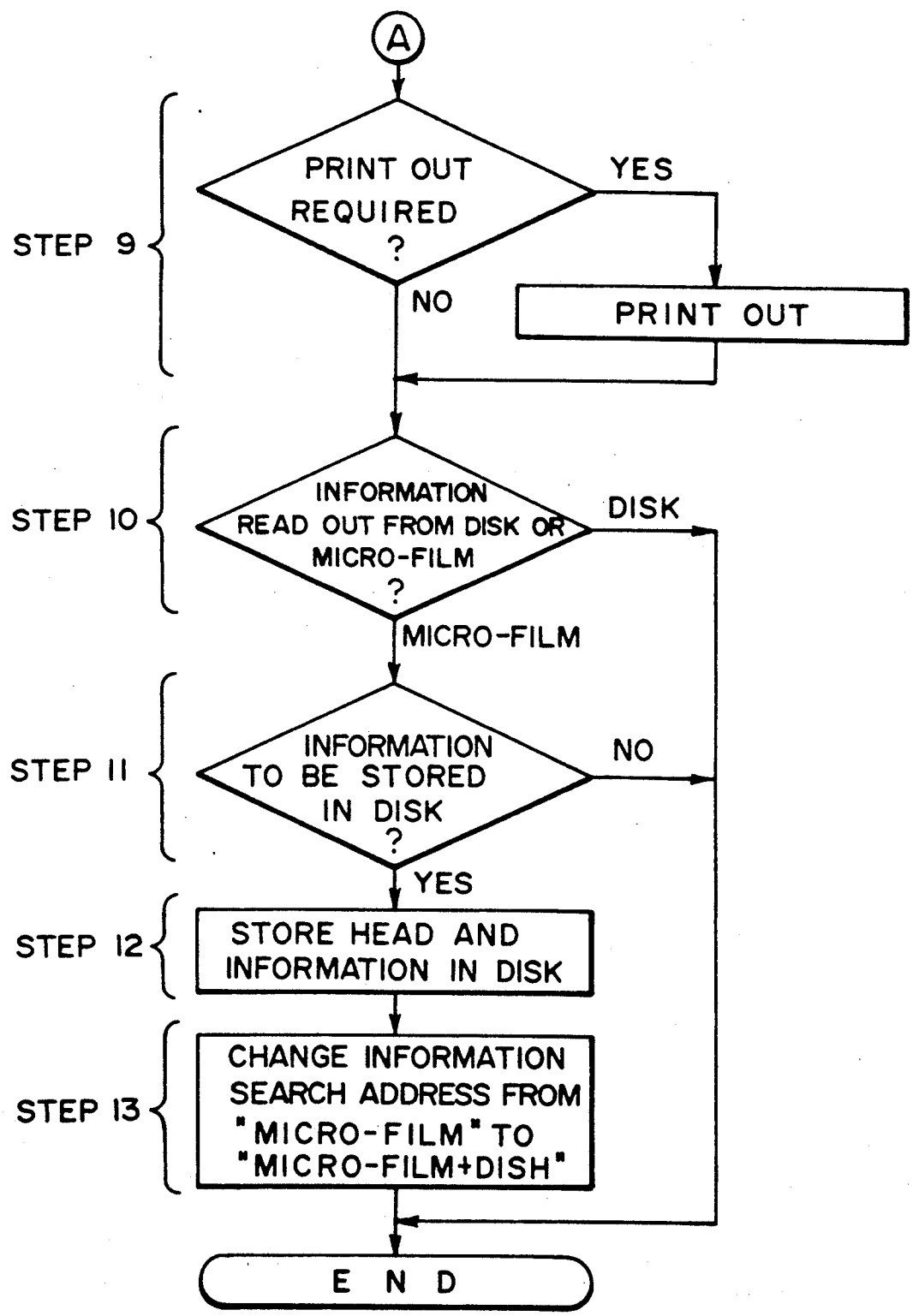
Figures 2B, 7:
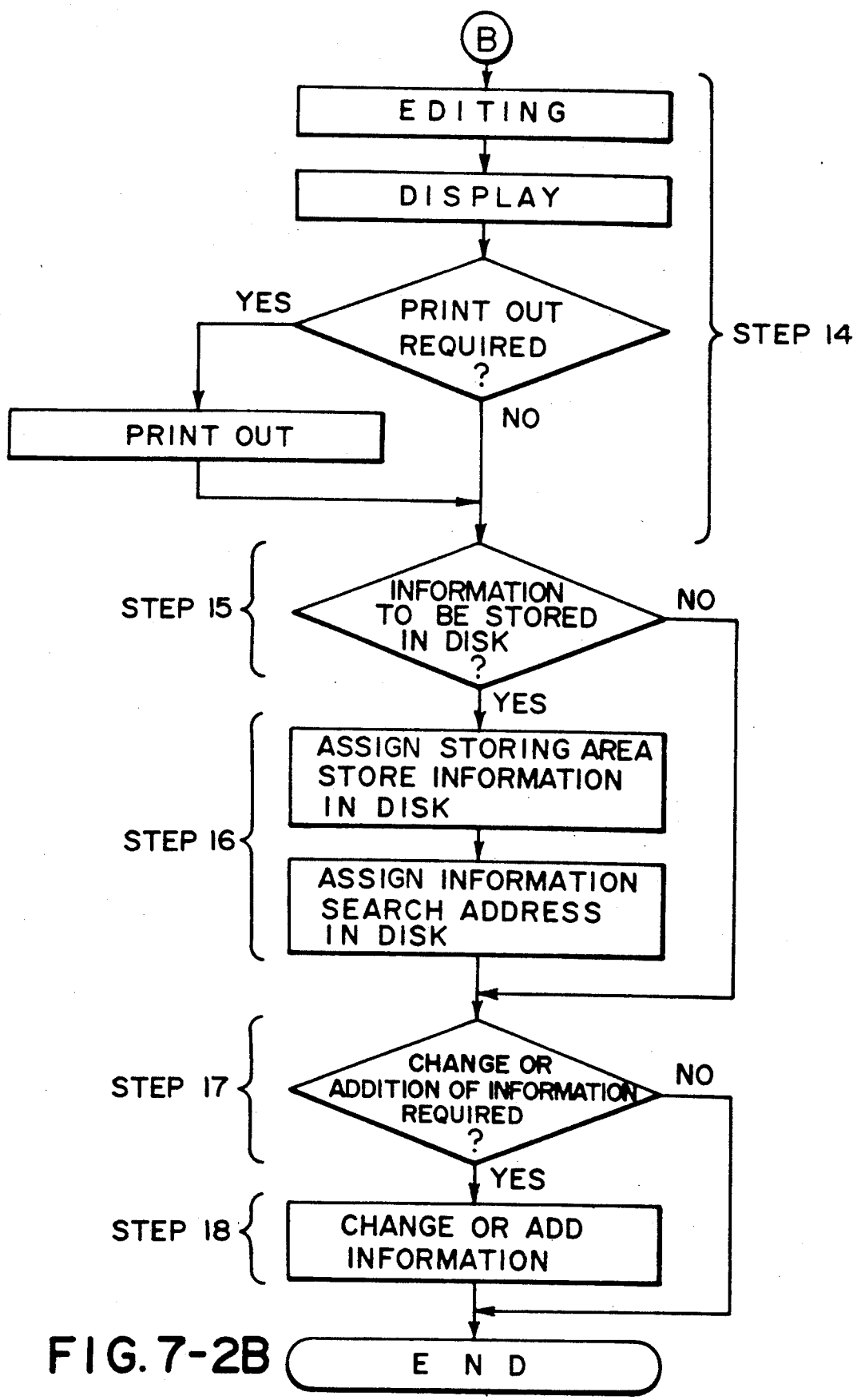

FIGS. 7-1 and 7-2 show further detailed flow charts. In Step 1 search information such as dates, keywords etc. relating to the desired data, is entered through a keyboard, voice recognition, image recognition, or character recognition. If the desired data is clearly defined, what is required is straightforward output of the detailed data. On the other hand, if the desired data is not clearly defined, the YES branch is chosen at Step 2 to search parameters belonging to the desired data, such as title, number of articles, content index, schematic drawings etc. from the data base, thus more closely defining the target data (Step 3). A succeeding Step 4 instructs a hard copying if necessary, and a Step 5 terminates the procedure if the operator wishes to terminate the search at this point. If a further detailed explanation is needed, the YES branch is chosen in the Step 5, and the program proceeds to a Step 6 by instructing any of the parameters relating to the desired information found in the Step 3. The Step 6 identifies the memory media storing the desired data, and, if they are stored both in the optical disk or optomagnetic disk and in the microfilm, access is made to the optical or optomagnetic disk. The obtained information is displayed in a Step 7. A step 9 instructs printout if said information is required as a hard copy. Then a Step 10 identifies whether the information has been read either from the optical or optomagnetic disk or from the microfilm, and, in case of reading from the microfilm, Steps 11 and 12 store the information into the optical or optomagnetic disk to enable ensuing retrieval of said information from said disk. In case of information storage in the disk in the Step 12, a Step 13 changes the corresponding search address from "microfilm" to "microfilm and disk".

In case information editing is requested in a Step 8, a Step 14 performs editing, such as modification in image or addition of characters, on the display, and provides a hard copy printout if necessary. A Step 15 instructs whether or not to store the thus obtained information in the disk, and, in case of such storage, a Step 16 performs the re-storage or new storage of information and records the search address in the disk. A Step 17 instructs changes or additions of title, content index etc. explained in the Steps 2 and 3, and, in case of such changes or additions, a Step 18 enters the desired title, content index etc. The search routine is terminated in this manner.

In this manner it is rendered possible to achieve a high-speed search by retrieving image indexes such as the title, content index etc. from the disk, or to conduct more detailed search based on such high-speed search. These searches are conducted very rapidly, by identifying whether the desired information is stored in the disk or in the microfilm file, and by utilizing the disk for search so far as possible.

The disk, being composed of re-writable optomagnetic disk, allows edition or processing to the searched data. Said data can be recorded anew or recorded again, and the corresponding index information can be likewise amended, added or recorded. Also the initially searched data can be utilized for searching new data obtained by modifying said initial data. In this manner the present invention allows one to obtain a maximum search speed in a system comprising memory media of different search speeds.

Figure 8B:
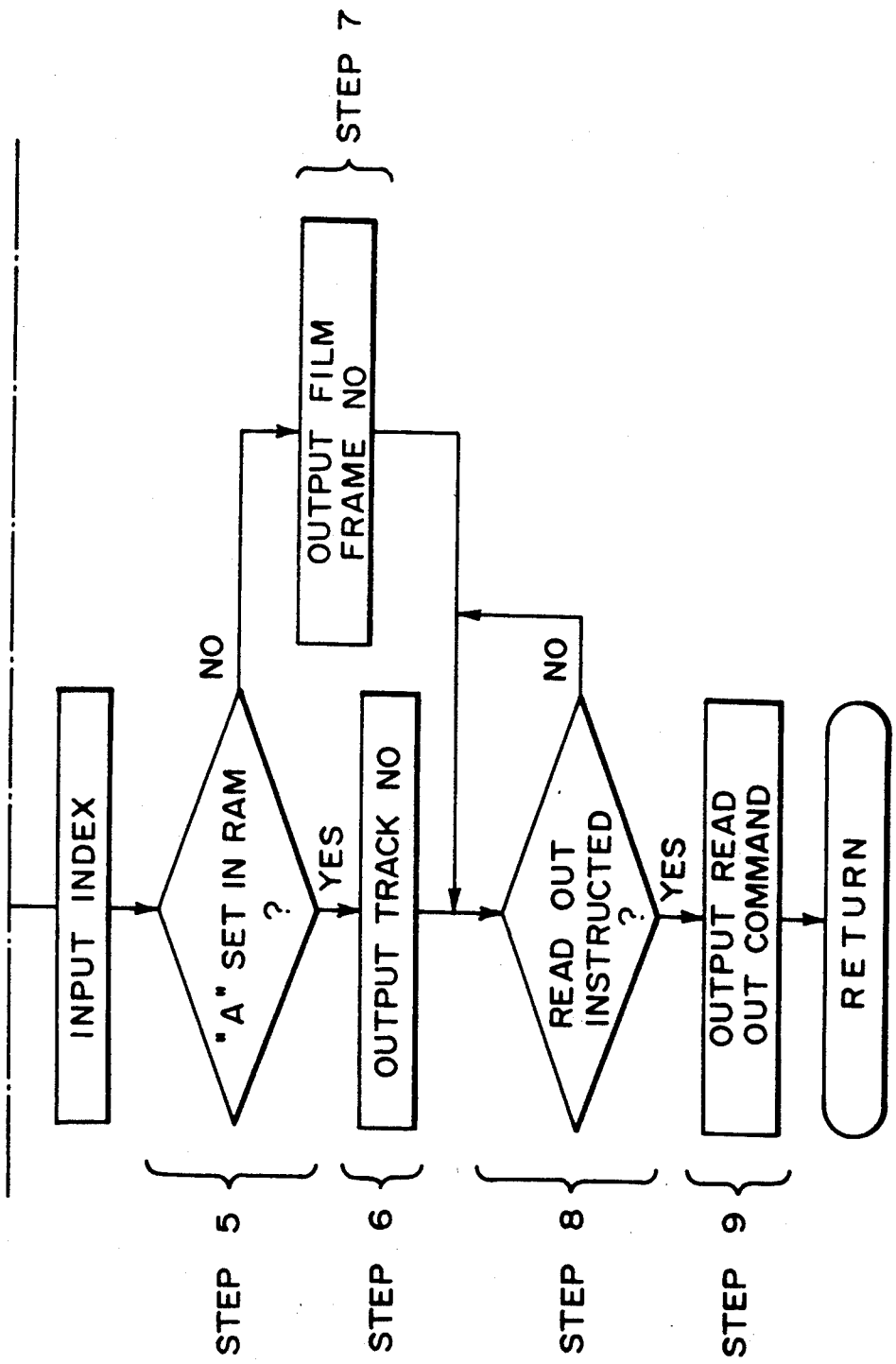
FIG. 8 shows the relationship of FIGS. 8A and 8B which are flow chart showing a search routine.

FIG. 8 shows a flow chart of the above-described search routine. In a Step 1 the keywords for search are entered through the keyboard of the work station 34. In a Step 2, the index data base stored in the index file 35 is developed in the RAM to form a search table. Then the table data in said RAM are searched according to the entered keywords, and a Step 3 displays the number of articles, list etc. of the corresponding data. Then, in a Step 4, there is entered an index, for example a desired list, taking the display as reference (including image index utilizing a reduced image). A succeeding Step 5 identifies whether the desired data are stored in the disk or in the microfilm by discriminating the state of data A which indicate the memory media and are stored with the index data in the RAM. A Step 6 provides the track number in case the data are stored in the disk, or the frame number in case of microfilm. If a readout instruction is given in a Step 8, a Step 9 releases a readout command for reading the image in said track or frame number. Thereafter there may be conducted the edition process starting from the Step 7 in FIG. 7.

What we claim is:
1. An information processing system comprising:
    means for storing image information, comprising first and second storage means, wherein input image information is selectively stored in said first and second storage means;
    instruction means for instructing read out of desired image information by inputting a search condition indicative of said desired image information;
    memory means for storing at least one of first information indicative of the frame number of the desired image information stored in said first storage means and second information indicative of the track number of the desired image information stored in said second storage means, in response to said search condition;
    decision means for deciding from which of said first and second storage means said desired image information is to be read out, depending on whether desired image information is stored in both or one of said first and second storage means; and
    store means for storing the desired image information read out according to the instruction by said instruction means.

2. An information processing system according to claim 1, wherein said information processing system is a system adapted for use in an information processing method and apparatus.

3. An information processing system according to claim 1, wherein said first storage means comprises a microfilm.

4. An information processing system according to claim 1, wherein said second storage means comprises an optical disk.

5. An information processing system comprising:
    first storage means for storing image information using microfilm;
    second storage means for storing image information using an optical disk;
    instruction means for instructing read out of desired image information by inputting a search condition indicative of said desired image information;
    store means for storing the desired image information read out according to the instruction by said instruction means;
    memory means for storing information indicative of whether said desired image information has been stored in said first storage means or in said second storage means, in response to said search condition; and
    control means for controlling said first and second storage means such that, when it is determined on the basis of both said search condition and said information stored in said memory means that said desired image information has been stored in both said first and second storage means, said desired image information is read out from said second storage means and for controlling storing of the read out desired information into said store means.

6. An information processing system according to claim 5, wherein said information stored in said memory means includes at least data indicating which one of said first and second storage means stores said desired image information therein and data indicating the frame number of the microfilm which stores said desired image information or indicating the track number of the optical disk which stores said desired image information.

7. An information processing system according to claim 5, wherein said second storage means includes a photomagnetic disk file.

8. An information processing system according to claim 5, wherein said information processing system in a system adapted for use in an information processing method and apparatus.

9. An information processing system comprising:
    first storage means for storing image information using microfilm;
    second storage means for storing image information using an optical disk;
    instruction means for instructing read out of desired image information by inputting a search condition indicative of said desired image information;
    memory means for storing information indicative of whether said desired image information has been stored in said first storage means or in said second storage means, in response to said search condition; and control means for controlling said first and second storage means such that, when it is determined on the basis of both said search condition and said information stored in said memory means that said desired image information has been stored not in said second storage means but in said first storage means, said desired image information is read out from said first storage means and said read-out image information is stored in said second storage means;

renewal means for renewing contents of said memory means in response to storage of said read-out image information in said second storage means;

storing means for temporarily storing the read-out desired image information; and output means for outputting the image information stored by said storing means.

10. An information processing system according to claim 9, wherein said information stored in said memory means includes at least data indicating which one of said first and second storage means stores said desired image information therein and data indicating the frame number of the microfilm which stores said desired image information or indicating the track number of the optical disk which stores said desired image information.

11. An information processing system according to claim 9, further comprising editing means for editing said read-out image information in order to produce new image information which is then stored in said second storage means, and deriving means for deriving search information for searching said image information and said new image information.

12. An information processing system according to claim 11, wherein said second storage means includes a photomagnetic disk file.

13. An information processing system according to claim 9, wherein said second storage means includes a photomagnetic disk file.

14. An information processing system according to claim 9, wherein said information processing system is a system adapted for use in an information processing method and apparatus.

15. An information processing system comprising:

storing means for storing both a plurality of image information and a plurality of reduced image information;

input means for inputting a search condition;

readout means for reading out a plurality of corresponding reduced image information in response to the search condition input by said input means;

instructing means for instructing readout of the image information corresponding to one of the plurality of reduced image information; and control means for controlling said readout means such that image information corresponding to the read-out reduced image information is read out in response to a readout instruction from said instructing means.

16. An information processing system according to claim 15, further comprising display means for displaying both said image information and said reduced image information and select means for selecting one from among said reduced image information display by said display means, wherein said process means is structured and arranged for controlling said display means and said select means such that first, said display means displays a plurality of said reduced image information at the same time in response to said input search condition and such that next, said select means selects one from among said displayed reduced image information and displays only the image information corresponding to the reduced image information selected by said select means.

17. An information processing system according to claim 15, wherein said storage means includes at least one optical disk or the like capable of storing a large amount of digital data.

18. An information processing system according to claim 15, wherein said image information includes image information read out from one or more microfilms.

19. An information processing system according to claim 15, wherein sad storage means includes a photomagnetic disk file.

20. An information processing system according to claim 15, further comprising:

means for deciding whether to read out said image information instead of reading out said reduced image information based on said search condition input by said input means.

21. An information processing system according to claim 15, wherein said information processing system is a system adapted for use in an information processing method and apparatus.

22. An information processing system according to claim 15, wherein the reduced image information comprises a small image having no relationship with the image information and is used for searching the image information.

23. An information processing system according to claim 15, wherein the reduced image information comprises a reduced portion of the image information.

24. An information processing system comprising:

first storage means for storing a plurality of image information;

second storage means for storing a plurality of image information, wherein said second storage means has a retrieval speed faster than that of said first storage means;

input means for inputting retrieval information associated with desired image information;

retrieving means for retrieving the desired image information from said second storage means on the basis of the retrieval information input by said input means when the desired image information has been stored in both said first and second storage means; and store means for storing image information retrieved from said first or second storage means for an output of the retrieved image information.

25. An information processing system according to claim 24, wherein said information processing system is a system adapted for use in an information processing method and apparatus.

26. An information processing system comprising:

at least one of first storage means for serially storing a plurality of image information and second storage means for storing a plurality of image information, wherein said second storage means is random-access;

memory means for storing both storage-means information, indicative of which of said first and second storage means has stored a desired image therein, and position information, indicative of where the desired image has been stored;

control means for controlling said first and second storage means on the basis of both the storage-means information and the position information, such that serial access is executed for the desired image in said first storage means on the basis of the position information or a random-access is executed for the desired image in said second storage means on the basis of the position information; and store means for storing image information of said first or second storage means, to which the serial or random access is executed, for an output of the image information.

27. An information processing system according to claim 26, wherein said information processing system is a system adapted for use in an information processing method and apparatus.

28. An information processing system comprising:
storage means for storing a plurality of image information, wherein said storage means is writable;
input means for inputting retrieval information associated with desired image information;
retrieval means for retrieving image information from said storage means on the basis of the retrieval information from said input means;
editing means for editing the image information retrieved by said retrieval means; and
control means for controlling said retrieval means such that both the image information and the image information edited by said editing means can be retrieved using the same retrieval information.

29. An information processing system according to claim 28, wherein said information processing system is a system adapted for use in an information processing method and apparatus.

30. An information processing system comprising:
storage means for storing a plurality of image information, wherein said storage means is writable;
input means for inputting retrieval information associated with desired image information;
retrieval means for retrieving image information from said storage means on the basis of the retrieval information input via said input means;
editing means for editing the image information retrieved by said retrieval means; and
writing means for writing the image information edited by said editing means, instead of the retrieved image information.

31. An information processing system according to claim 30, wherein said information processing system is a system adapted for use in an information processing method and apparatus.

32. An information processing system according to claim 30, wherein said storage means includes a photomagnetic disk file.

33. An information processing system according to claim 30, wherein said storage means includes at least one optical disk or the like capable of storing a large amount of digital data.

34. An information processing system comprising:
at least one of first storage means for storing a plurality of retrievable image information and second storage means for storing a plurality of retrievable image information, said second storage means being of a different storing type said first storage means;
input means for inputting retrieval information associated with desired image information;
retrieval means for retrieving image information from said first or second storage means on the basis of common retrieval information from said input means, wherein said retrieval means automatically selects one of said first and second storage means on the basis of the common retrieval information in order to output desired image information;
storing means for temporarily storing the image information retrieved by said retrieval means; and
output means for outputting the image information stored by said storing means.

35. An information processing system according to claim 34, wherein said information processing system is a system adapted for use in an information processing method and apparatus.

36. An information processing system comprising:
at least one of first storage means for storing a plurality of image information and second storage means for storing image information, said second storage means being different than said first storage means and being rewritable;
input means for inputting retrieval information associated with desired image information;
retrieval means for retrieving image information from said first or second storage means on the basis of the retrieval information from said input means, wherein said retrieval means automatically selects one of said first and second storage means on the basis of the common retrieval information in order to output desired image information;
control means for storing the image information in said second storage means when image information is retrieved from said first storage means by said retrieval means;
storing means for temporally storing the image information retrieved by said retrieval means; and
output means for outputting the image information stored by said storing means.

37. An information processing system according to claim 36, wherein said information processing system is a system adapted for use in an information processing method and apparatus.

* * * * *

UNITED STATES PATENT AND TRADEMARK OFFICE
CERTIFICATE OF CORRECTION

PATENT NO. : 5,218,673
DATED : June 8, 1993
INVENTOR(S) : TAKUTOSHI FUJIWARA

Page 1 of 2

It is certified that error appears in the above-identified patent and that said Letters Patent is hereby corrected as shown below:

ON TITLE PAGE item [56] REFERENCES CITED:

Under U.S. PATENT DOCUMENTS, "Kamaiwa" should read --Kanaiwa--.

Under FOREIGN PATENT DOCUMENTS, "57-29279  9/1982  Japan" should read --57-59279  9/1982  Japan--.

COLUMN 2

Line 9, "key-" should read --a key- --.
Line 37, "senser" should read --sensor--.
Line 50, "However" should read --However,--.

COLUMN 4

Line 62, "are" should read --are a--.

COLUMN 8

Line 53, "in" should read --is--.
Line 68, "and" should be deleted.

COLUMN 9

Line 63, "display" should read --displayed--.

COLUMN 10

Line 14, "sad" should read --said--.

UNITED STATES PATENT AND TRADEMARK OFFICE
CERTIFICATE OF CORRECTION

PATENT NO. : 5,218,673
DATED : June 8, 1993
INVENTOR(S) : TAKUTOSHI FUJIWARA

It is certified that error appears in the above-identified patent and that said Letters Patent is hereby corrected as shown below:

COLUMN 12

Line 8, "type" should read --type than--.
　　Line 46, "temporally" should read --temporarily--.

Signed and Sealed this

Seventeenth Day of May, 1994

Attest:

BRUCE LEHMAN

Attesting Officer　　　Commissioner of Patents and Trademarks